United States Patent [19]

Bagley et al.

[11] Patent Number: 4,885,186

[45] Date of Patent: Dec. 5, 1989

[54] METHOD FOR PREPARATION OF SILICATE GLASSES OF CONTROLLED INDEX OF REFRACTION

[75] Inventors: Brian G. Bagley, Watchung Boro; William E. Quinn, Middlesex Boro, both of N.J.

[73] Assignee: Bell Communications Research, Inc., Livingston, N.J.

[21] Appl. No.: 291,630

[22] Filed: Dec. 29, 1988

[51] Int. Cl.⁴ .............................................. B05D 3/06
[52] U.S. Cl. ...................................... 427/38; 427/162; 427/333; 427/376.2; 427/385.5; 427/387; 427/397.7; 427/421; 427/429; 427/430.1; 427/444

[58] Field of Search .............. 427/38, 102, 333, 376.2, 427/385.5, 387, 397.7, 421, 429, 430.1, 444

*Primary Examiner*—Bernard Pianalto
*Attorney, Agent, or Firm*—James W. Falk; Edward M. Fink

[57] ABSTRACT

A method for the preparation of silicate glasses of controlled index of refraction involves the thermal and/or plasma processing of organo-silicon polymers. Compositions so treated evidence a suppressed index of refraction which may subsequently be increased by sintering to yield a material uniquely suited for use in fiber optic devices.

3 Claims, 1 Drawing Sheet

METHOD FOR PREPARATION OF SILICATE GLASSES OF CONTROLLED INDEX OF REFRACTION

This is a division of application Ser. No. 050,045, filed May 15, 1987, which is a continuation of application Ser. No. 752,052, filed July 5, 1985, now abandoned.

This invention relates to a method for the thermal and/or plasma decomposition of organo-silicon polymers. More specifically, the present invention relates to a method for the preparation of a material of controlled index of refraction by the thermal and/or plasma processing of an organo-silicon polymer and to a device including such material.

BACKGROUND OF THE INVENTION

During the past decade, there has been widespread interest in a class of materials evidencing optical properties suitable for use in fiber optic and integrated optic technology. Among the most prominent of such materials has been silicon dioxide, a composition known for its ability to successfully guide light. Unfortunately, workers in the art have encountered a modicum of difficulty in guiding light through this material because of the absence of convenient claddings which must evidence indices of refraction below that of the core material, namely, pure bulk silicon dioxide. Heretofore, efforts to overcome this limitation have focused upon the use of fluorine or boron doped claddings or the use of an organic coating on the surface of the silicon dioxide. Unfortunately, the doping effort proved costly and yielded only minor changes in the index of refraction. In marked contrast, the organic coating was able to effect large changes in refractive index but proved to be thermally unstable.

SUMMARY OF THE INVENTION

In accordance with the present invention these prior art limitations are effectively obviated by a novel technique which permits accurate control of the refractive index of a silicon dioxide based material over a broad range. Specifically, we have found that the index of refraction of this material can be varied substantially by the thermal and/or plasma processing of an organo-silicon polymer from a value of approximately 1.38 up to values that exceed that of silicon dioxide (1.454). This behavior is initially attributed to the presence of a fenestrated void structure comprising voids of from 10–100 Å which are homogeneously distributed. A subsequent sintering heat treatment of the material causes an increase in the index of refraction up to a value approximating that of bulk fused silicon (1.454), facilitating its use as a cladding material for pure silicon dioxide. The desired index depression can be accurately controlled by the thermal and/or plasma processing.

We have also found that the index of refraction of fused silicon dioxide may also be adjusted by preparing alloy glasses, namely, alloys of silicon dioxide with phosphorous, boron or germanium, and subsequently heating the resultant alloys at moderate temperatures to adjust the index of refraction to the desired level.

BRIEF DESCRIPTION OF THE DRAWING

The invention will be more readily understood by reference to the following detailed description taken in conjunction with the accompanying drawing wherein.

DETAILED DESCRIPTION

Figure 1:
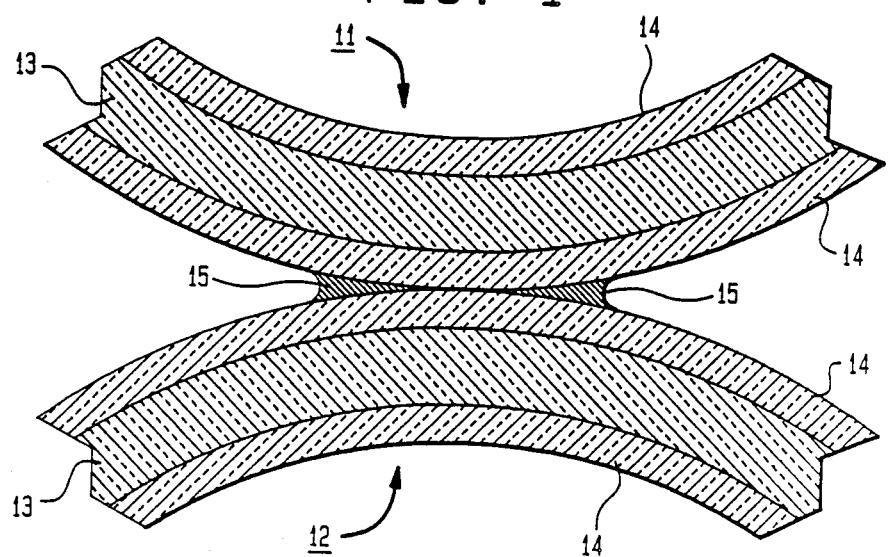
FIG. 1 is a front elevational view of a fiber coupler in accordance with the present invention.

In the operation of the process, a suitable source of silicon dioxide is selected from conventional commercially available materials. Typical of such materials are the organosilsesquioxane polymers prepared by the hydrolysis and condensation polymerization of methyltriethoxysilane. These compositions are $SiO_2$ precursors evidencing low temperature ceramic processing advantages and are thermoset organo-silicon polymers that cure to form hard glassy films. We have found that the cured organo-silicon films can be converted to silicate glasses by both thermal and plasma processes. Application of the material may be effected by spinning, dipping, spraying, painting, etc.

In a process implementing our invention, the organo-silicon polymer is first dissolved in a suitable organic solvent such as ethyl alcohol, butyl alcohol, ethyl acetate, and the like. The concentration of polymer in solution may range from 1–80 percent based upon the technique chosen for application. Thus, for example, for spinning purposes a typical solution might comprise 10 percent, by weight, organo-silicon polymer in ethyl alcohol. The polymer readily dissolves in the organic solvents in the absence of heat with a minimum level of stirring.

In a typical spinning process, the solution is spun onto a substrate using a commercial photoresist spinner, the thickness of the film being determined by considerations pertaining to solute concentration and spin speed. Thus, for example, a 10% solution spun 2000 rpm for 20 seconds yields a thickness of approximately 4000 Å.

Next in this embodiment, the spun film is air dried for a time period of at least 5 minutes and baked thermally at a temperature ranging from 200°–250° C. for approximately 30 minutes. This baking step effects curing of the film, that is, it results in crosslinking or joining of all the polymer chains. At this juncture, the resultant film is not soluble in the solvent from which it was spun and cannot be scratched by a number 2 pencil. Additional heat treatment at higher temperatures is accompanied by a loss of the organic components of the polymer, densification of the film and an increase in refractive index. At temperatures within the range of 450°–700° C., the organic component is completely removed and the film continues to sinter. At temperatures ranging from 1000° to 1100° C. the film is dense and evidences the refractive index of fused quartz.

In an alternative embodiment, an oxygen or air plasma may be employed as a substitute for the pyrolytic (thermal) decomposition at 450°–700° C. This end may typically be effected in a conventional barrel reactor at room temperature using a 13.56 megahertz plasma with air or oxygen. The duration of treatment is dependent upon the thickness of the material but 15 minutes is found to be adequate to effect the desired purpose. In the event water is produced as a by-product of this process, heating to about 250° C. may be employed to remove the moisture.

The resin prepared in accordance with the foregoing procedure may conveniently be applied to optical fibers as either a protective coating or as a wave guiding cladding. This end may be attained by preparing a viscous solution of the described resin and applying it with a fiber coating cup. The solution may be placed in the coating cup that is normally employed for the protective jacket. Then, the fiber, a silica core, is drawn, run through the coating cup, through a tube furnace to cure the coating and finally spooled. Curing may be conveniently effected at 400° C. in a short tube furnace.

Alternatively phospho, germano and boro-silicate glasses may be prepared by adding a suitable boron, germanium or phosphorous source to the organo-silicon polymer solution. Thus, for example, phospho-silicate glasses can be made by mixing an appropriate phosphorous source with the organo-silicon polymer and processing the mixture as described previously. Phosphorous sources suitable for this purpose include those soluble in the organo-silicon polymer solution, those capable of reacting with the functional groups (hydroxy and ethoxy) of the polymer, those which do not volatilize prior to reaction, and those which do not cause rapid gelling of the solution when admixed therewith. Typical sources meeting this requirement are phenyl phosphinic acid, phenyl phosphonic acid and $H_3PO_4$ (phosphoric acid), each of which is soluble in ethanol and ethyl acetate.

In this embodiment of our invention, we have found that the phospho-silicates may be prepared with Si-P ratios ranging from greater than 30:1 to 1:1. A typical 10:1 Si:P glass may be prepared as follows:

A stock solution containing 10 percent, by weight, organisilsesquioxane is chosen as the source of the silica. The solution contained 1.36 moles of silicon per kilogram of solution (1.36 molal). The silicon resin, based on gravimetric measurements in air revealed that the resin was 82% $SiO_2$. During the measurement, the resin oxidized from $SiO_{1.5}$ to $SiO_2$. Following, a 1.36 molal stock solution of phosphoric acid was added to the resin solution in the desired ratio and the mixture spun onto a substrate, air dried and baked in the manner described above. It is noted that baking of the film serves only to cure the material and remove cure products and does not effect removal of any of the organic side groups. These resulting films are then stable to 300° C. with a depressed index suitable for guiding light in $SiO_2$. Alteration in refractive index is implemented by removal of organic components from the polymer which results in voids in the matrix. These voids cause a depressed refractive index because the index of air or a vacuum is lower than that for the phospho-silicate. Subsequent sintering of the porous matrix serves to remove the voids and elevate the refractive index to a desired level. We have determined that at temperatures less than 500° C. for thirty minutes the refractive index is only dependent on temperature to a limited extent. At temperatures in excess of 500° C. the sintering mechanism obtains and the index increases with increasing temperature until at 1000° C. at thirty minutes the index exceeds that of fused silica. Thus, in this case, the index can be controlled.

It will be appreciated that boro-silicate glasses can be prepared in the same manner as the phospho-silicates. Thus, for example, a boron oxide in ethanol solution may be added in a 1:10 ratio to the organo-silicon resin (1.36 molal) solution to obtain a 10:1 Si-B ratio and applied and baked as described previously. In this case, however, the index of refraction of a bulk boro-silicate is close to that of bulk (fully densified) silicon dioxide. Consequently, only depressed index materials are obtained in this manner. However, an advantage observed lies in the enhancement of sintering kinetics.

The germano-silicate glasses may not be prepared in a manner similar to the phospho-silicates because the geranium ethoxide solution employed rapidly gels the organo-silicon solution. The germanium ethoxide solution is applied on top of the cured organo-silicon film. The solution fills the voids in the porous network and the germanium ethoxide reacts with the organo-silicon polymer to form a stable film. This film may then be processed, as described above, to control the index of refraction.

Figure 2:
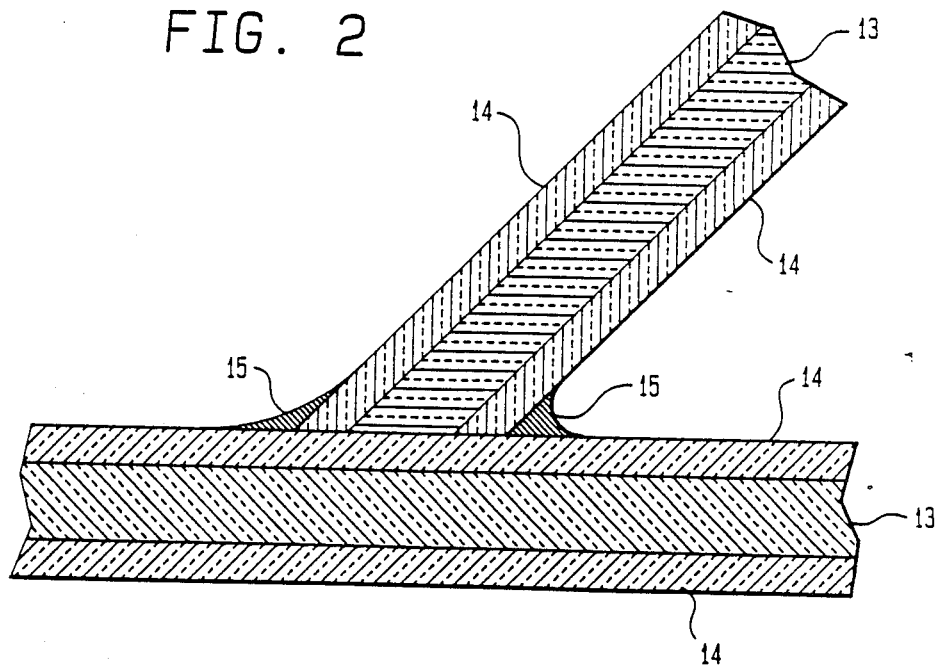
FIG. 2 is a front elevational view of a fiber tap in accordance with the invention.

With reference now more particularly to FIG. 1, there is shown, in front elevational view a cross-section of a typical fiber coupler in which the materials described herein may be employed. Shown in the drawing are fibers 11 and 12 including an $SiO_2$ core 13 and a cladding 14 comprising the cured organo-silsesquioxane described herein. The refractive index of the claddings are altered locally and made equal to each other by pyrolytic decomposition possibly combined with exposure to an air/oxygen plasma in a barrel reactor at the point where the claddings of the fibers touch following which an organic coating 15 is painted upon the treated area. This structure permits light to be guided in a different direction, light being leaked at those points where the refractive index has been altered. A variation of this concept is depicted in FIG. 2 wherein a fiber tap is shown which permits a signal to be split off from a given main cable.

While the invention has been described in detail in the foregoing specification, the aforesaid is by way of illustration only and is not restrictive in character. It will be appreciated by those skilled in the art that the processing parameters may be varied without departing from the spirit of the invention. Modifications which will readily suggest themselves to persons skilled in the art are all considered within the scope of the invention, reference being had to the appended claims.

What is claimed is:

1. Method for the preparation of silicate glass of controlled index of refraction which comprises the steps of
   (a) curing an organo-silicon polymer containing a phosphorous or boron source at a temperature ranging from 200°–250° C.,
   (b) exposing said cured resin to an air or oxygen plasma in a barrel reactor at room temperature, so resulting in the formation of a fenestrated structure having an index of refraction ranging down to 1.38, and
   (c) sintering said structure at a temperature within the range of 500°–1000° C. to effect an increase in the refractive index to a desired value ranging up to and exceeding the refractive index of bulk fused silica.

2. Method for the preparation of a germanosilicate glass of controlled index of refraction which comprises the steps of
   (a) curing an organo-silicon polymer upon a suitable substrate at a temperature ranging from 200°–250° C. for 30 minutes,
   (b) depositing a layer of a germanium ethoxide solution in ethanol upon said cured film, heat treating the film at 200°–250° C. for 30 minutes and then exposing the resultant structure to an air or oxygen plasma in a barrel reactor at room temperature, so resulting in the formation of a fenestrated structure having an index of refraction ranging down to 1.38, and (c) sintering said structure at a temperature within the range of 500°–1000° C. to effect an increase in the refractive index to a desired value ranging up to a value which exceeds the refractive index of bulk fused silica.

3. Method for the preparation of a silicate glass of controlled index of refraction which comprises the steps of (a) curing an organo-silicon thermosetting resin in a reaction vessel at a temperature within the range of 200°–400° C. for a time period within the range of 1–30 minutes;

(b) exposing said cured resin to an oxygen or air plasma in a barrel reactor at room temperature, so resulting in a structure having an index of refraction less than that of bulk fused silica; and (c) adjusting the refractive index of the structure by sintering at a temperature within the range of 600°–1100° C. for a time period within the range of 1–60 minutes to effect an increase in the refractive index to a desired value ranging up to the refractive index of bulk fused silica.

* * * * *

UNITED STATES PATENT AND TRADEMARK OFFICE
CERTIFICATE OF CORRECTION

PATENT NO. : 4,885,186

DATED : December 5, 1989

INVENTOR(S) : Brian G. Bagley and William E. Quinn

It is certified that error appears in the above-identified patent and that said Letters Patent is hereby corrected as shown below:

Column 3, line 29, "silica," should read --silica.--,
          line 36, "solultion" should read --solution--.
Column 4, line 40, "of silicate" should read --of a silicate--.

Signed and Sealed this

Thirty-first Day of December, 1991

Attest:

HARRY F. MANBECK, JR.

*Attesting Officer*  *Commissioner of Patents and Trademarks*